March 3, 1964 C. D. JACOBS 3,123,173
VARIABLE SPEED DRIVE MECHANISM FOR GOLF CARTS
Filed Nov. 30, 1961
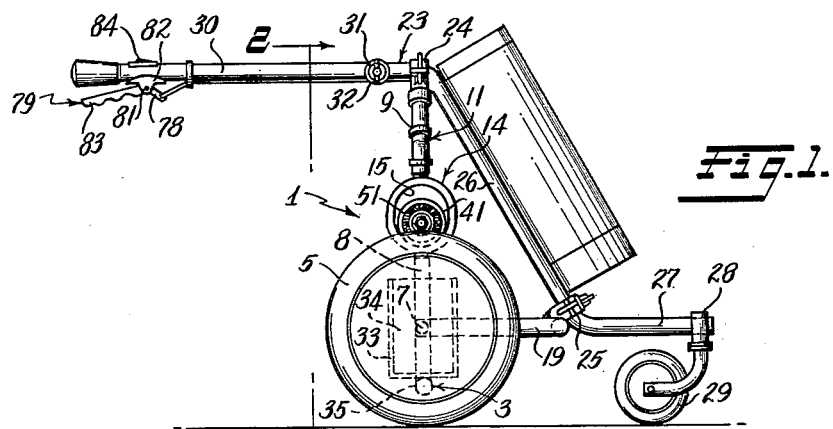
Fig.1.
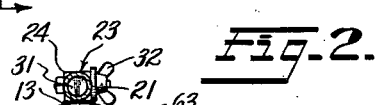
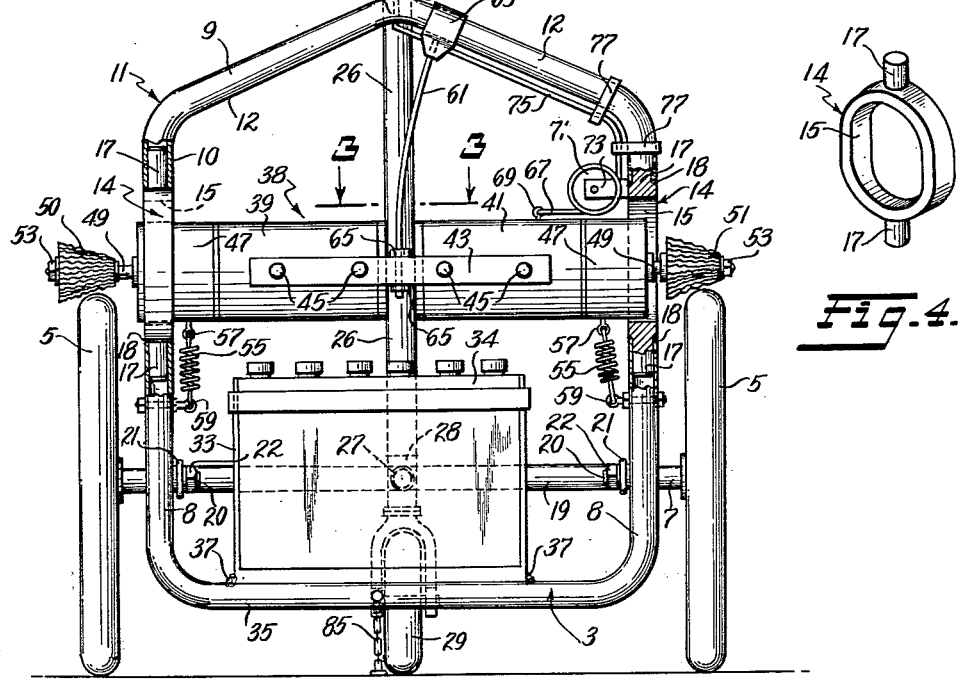
Fig.2.
Fig.4.
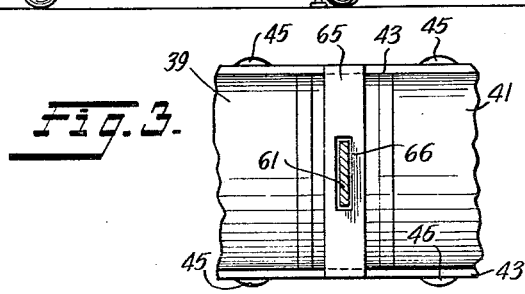
Fig.3.
INVENTOR.
Charles D. Jacobs
BY
Bacon & Thomas
ATTORNEYS

United States Patent Office 3,123,173
Patented Mar. 3, 1964

3,123,173
VARIABLE SPEED DRIVE MECHANISM FOR GOLF CARTS
Charles D. Jacobs, 1100 S. Lake Side Drive, Lake Worth, Fla.
Filed Nov. 30, 1961, Ser. No. 155,978
3 Claims. (Cl. 180—74)

The present invention is directed to an electric drive for wheeled vehicles and more particularly to an improved electric drive mechanism for frictionally driving a wheeled vehicle at varying speeds from constant speed electric motors. The invention is particularly adapted for use with golf carts and the like where a need exists for an inexpensive powered vehicle or for means to add a power drive to hand-drawn carts.

In the past, electric drive mechanisms for frictionally driving wheeled vehicles at varying speeds have required costly mechanical devices and expensive speed control mechanism or, where constant speed electric motors were employed, no structure was provided for driving the vehicle directly therefrom at varying speeds.

It is, therefore, an object of this invention to provide constant speed electric motor means adapted to frictionally drive a wheeled vehicle at varying speeds.

Another object of the invention is to provide electric drive mechanism for frictionally driving a wheeled vehicle at varying speeds which is adapted to be supported on the vehicle frame for both lateral and vertical movement with respect thereto.

Another object is to provide electric drive mechanism for frictionally driving a wheeled vehicle at varying speeds which is adapted to be disposed above the wheels of the vehicle and floatingly supported thereon.

Another object is to provide a pair of constant speed electric drive mechanisms which are adapted to rotate in opposite directions for driving a wheeled vehicle in a forward direction at varying speeds.

Another object is to provide variable speed electric drive mechanism for wheeled vehicles adapted to employ the weight thereof to increase the frictional contact between the vehicle wheels and the driving mechanism.

Another object is to provide a variable speed electric drive mechanism for vehicles in which resilient means is employed to absorb the torque of the driving mechanism as well as to cause the driving mechanism to be disconnected from the vehicle wheels.

Another object is to provide a vertically disposed vehicle frame adapted to floatingly support variable speed, electric drive mechanism thereon.

Another object is to provide a power-driven golf cart adapted to lead and conserve the energy of the operator thereof.

Another object is to provide a power driven golf cart adapted to precede the operator thereof and to assist the operator in moving about on a golf course.

Another object is to provide as a unit, a simple, inexpensive and easily controlled drive mechanism for wheeled vehicles.

Another object is to provide a drive mechanism which may be quickly and easily attached as a unit to conventioned non-powered vehicles.

These and other objects of the invention will become more apparent from the following specification when taken in conjunction with the drawings, in which:

FIG. 1 is a side elevational view of a wheeled golf cart adapted to be driven at varying speeds by a pair of floatingly mounted, constant speed electric motors;

FIG. 2 is an enlarged sectional end view, partly broken away, taken on line 2—2 of FIG. 1;

FIG. 3 is an enlarged fragmentary sectional view taken on line 3—3 of FIG. 2, showing the connection between the electric motors and the leaf spring associated therewith; and FIG. 4 is an enlarged perspective view of the yoke employed to floatingly mount the electric motors in opposite sides of the vehicle frame.

For the purpose of illustration, the drive mechanism of the present invention is shown mounted on a golf cart which is generally designated by the numeral 1. A U-shaped tubular subframe 3, formed of suitable lightweight material, is vertically disposed between wheels 5 and supported thereon by means of stub axles 7, rigidly attached in aligned relation to opposite sides 8 of frame 3 and rotatably mounting wheels 5 at the outer ends thereof. An upper tubular frame portion 9, of generally inverted, U-shaped configuration, extends upwardly from the side portions 8 to complete a substantially square shaped, vertically disposed frame 11, the upper member 12 being inclined upwardly from the sides 10 thereof to apex 13. The lower ends of sides 10 of the upper frame portion 9 may be joined to the upper ends of sides 8 of the lower frame 3 by means of a pair of yokes 14, each of which is provided with an opening 15 of general oval configuration. A pair of lugs 17, which are rigidly secured to the outer surface of each yoke 14 at opposite ends thereof, are fixedly secured within the openings in the upper ends of tubular side members 8 and within the openings in the lower ends of tubular sides 10, with openings 15 disposed in axial alignment, to join subframe 3 to upper frame 9.

Golf cart 1 is constructed to be collapsible and foldable in order to occupy the least possible space during storage or transportation. A horizontally disposed, U-shaped, frame portion 19 extends forwardly from frame 11. Threaded studs 20, rigidly secured to the inner surface of side portion 8 of U-shaped frame member 3, pass through openings formed in the flattened, free ends 21 of frame portion 19 to pivotally mount portion 19 on frame 11. Nuts 22 threaded onto studs 20 prevent accidental removal of ends 21 from studs 20.

A tubular, offset strut 23 extends lengthwise at the center of golf cart 1 and is fixedly secured to apex 13 of frame 11 by means of a clamp 24 of the type conventionally employed to secure crossed tubes or rods together. Strut 23 is bent to extend downwardly and forwardly from frame 11 and is fixedly secured to adjacent the center of the bottom of the U-shaped frame extension 19 by means of a clamp 25 which may be similar to clamps 24, providing a support portion 26 adapted to receive a golf bag thereon. Strut 23 is further bent to extend from clamp 25 horizontally forwardly of the vehicle to provide a support portion 27. A caster 28, including caster wheel 29, is fixedly mounted adjacent the outer end of the support portion 27 in order to provide the vehicle with 3-point support. A handle portion 30 extends rearwardly from strut 23 and is adjustably pivoted thereto by joint 31. Joint 31 may be of the conventional type employed on golf carts and the like to maintain the handle at the desired angle for the comfort and convenience of the golfer and includes 2 disk-like members, each of which is provided on the inner, cooperating surface thereof with serrations or corrugations and which are secured together by a bolt and large wing nut 32. For storage or transportation, handle 30 may be pivoted from a horizontal position to a depending vertical position or the entire strut 23 and handle 30 may be removed from frame 11 and portion 19 by removing clamps 24 and 25. Frame portion 19 may be pivoted upwardly to a position substantially parallel to frame 11 when clamp 25 is removed. The receptacle 33, adapted to hold a battery 34, may be rigidly secured to the lower crossbar 35 of frame member 3 by means of welds 37.

The driving mechanism 38 for the golf cart 1 includes a pair of constant speed electric motors 39 and 41, secured together in back-to-back, spaced apart, axial alignment by means of rigid bars 43 secured to the outer casings thereof by rivets 45, or in any other desirable manner. Each motor 39 and 41 is provided at the outer end thereof with a housing 47 containing conventional speed reduction gearing which is operably connected to the drive shaft of the motor, not shown. A shaft 49 extends outwardly from the outer end of each housing 47 and is adapted to be driven at a reduced speed by the gearing contained therein. On the outer end of drive shaft 49 of motor 39, a cone pulley 50 is fixedly mounted against axial movement with respect thereto and for rotation therewith, and a cone pulley 51 is similarly mounted on the outer end of drive shaft 49 of motor 41. The cone pulleys 50 and 51 are mounted on drive shafts 49 with the apex of the cones pointed in the same direction and are secured against removal therefrom by nuts 53 threaded onto the outer ends of shafts 49. The pulleys 50 and 51 may be roughened or corrugated on the outer surface thereof. The electric motors 39 and 41 are of similar construction and rotate at substantially the same speed. However, the motors rotate in opposite directions so that by securing them together in back-to-back relation, pulleys 50 and 51 rotate in the same direction to drive the golf cart 1 in a forward direction.

The drive mechanism 38, including electric motors 39 and 41, housing 47 with speed reduction gearing, drive shafts 49 and cone pulleys 50 and 51, is disposed as a unit in yokes 14 for lateral and vertical movement therein and is so proportioned and arranged that, when in the inoperative position, drive mechanism 38 is disposed in the left-hand position, as illustrated in FIG. 2, with housings 47 resting on the bottoms of the opening 15 in yokes 14, and with the smaller ends of pulleys 50 and 51 disposed immediately above but not in contact with the outer periphery of the respective wheels 5 on opposite sides of the vehicle.

In order to maintain drive mechanism 38 in its lowermost possible position and to assure the desired frictional contact between cone pulleys 50 and 51 and wheels 5 when the mechanism 38 is moved to an operative position, tension springs 55 are attached at one end to the bottom of housing 47 by means of eye bolts 57 secured thereto and at the other end thereof to lower frame member 3 by means of eye bolts 59 secured thereto. It is desirable to limit the extent of lateral movement of drive mechanism 38 in order to prevent either of the housings 47 from moving inwardly of the cooperating yoke 14 a distance sufficient to be entirely removed therefrom and thus dropping to an inoperative position wherein one of the housing 47 is no longer disposed within and supported by the yoke 14. If desired, each eye bolt 57 may also serve as a stop for limiting lateral movement of drive mechanism 38 by being secured to the lower wall of the respective housing 47 in such a manner that one of the eye bolts 57 will contact the inner surface of the adjacent yoke 14 when the drive mechanism 38 is moved laterally to the predetermined limit of movement in either direction.

A leaf spring 61, rigidly secured at the upper end thereof to upper frame portion 9 by means of bracket 63, is employed to resiliently urge the drive mechanism 38 to the inoperative position and to absorb the driving torque of motors 39 and 41. Rigid bars 65, which span bars 43 between the inner ends of motors 39 and 41 and which are rigidly secured thereto as by welding to the upper and lower surfaces thereof, are provided with axially aligned, vertically disposed slots 66 therein for loosely receiving the lower end of leaf spring 61 therethrough. Spring 61 prevents drive mechanism 38 from rotating about its axis and is secured to upper frame member 9 by bracket 63 in such a manner that the spring continuously urges the drive mechanism 38 to the limit of movement in the left-hand direction.

The drive mechanism 38 may be moved in a right-hand direction against the action of spring 61 by means of Bowden wire 67, one end of which is attached to the upper surface of electric motor 41 by means of eye bolt 69 secured thereto. The wire 67 passes over pulley 71, mounted on frame 9 by means of bracket 73 rigidly attached thereto and through Bowden wire housing 75, suitably secured to upper frame member 9 and handle 30 by straps 77 and is attached at the other end thereof to one end 78 of the angular-shaped control lever 79. For convenient control of the drive mechanism, lever 79 is positioned adjacent the outer end of handle 30 and is pivoted intermediate the ends thereof on pin 81 which is suitably mounted on handle 21 by means of bracket 82 rigidly attached thereto. It will thus be seen that drive mechanism 38 may be moved laterally in a right-hand direction by lifting the other end 83 of lever 79 to pivot the control lever 79 about pin 81 to exert a pull on Bowden wire 67 and overcome the resistance of lever spring 61.

In order to control the simultaneous starting and stopping of motors 39 and 41, appropriate wires, not shown, extend from battery 34 to motors 39 and 41 and to a conventional off-on switch 84 positioned adjacent the outer end of handle 21. Any static electricity which may be present in the device may be discharged by means of a chain 85 attached to the lower portion of frame member 3 at one end thereof, the other end dragging in contact with the ground in the conventional manner.

In operation, the golf cart 1 may be driven by actuating switch 84 to start motors 39 and 41. The end 83 of control lever 79 is then pivoted upwardly a short distance to move drive mechanism 38 slightly to the right, thus causing the small ends of pulleys 50 and 51 to engage the respective wheels 5 and drive the vehicle. Continued upward movement of the end 83 of control lever 79 causes drive mechanism 38 to move further in a right-hand direction and also to move in a vertical direction as a portion of the pulleys 50 and 51 having a larger diameter than the small ends thereof is brought into contact with wheels 5, thereby driving the vehicle at an increased speed. When the drive mechanism 38 is moved to the limit permitted in a right-hand direction, the maximum speed will be attained. It will readily be seen that as the drive mechanism 38 is moved laterally in yokes 14 with cone pulleys 50 and 51 in contact with wheels 5, that the drive mechanism is also moved vertically thereof due to the change in diameter of the portion of pulleys 50 and 51 bearing on the periphery of wheels 5. It is considered to be within the scope of the present invention to convert a hand-drawn golf cart to a powered vehicle by providing yokes on the opposite sides of the frame and mounting a drive mechanism 38 therein in the manner disclosed.

The speed at which the drive mechanism is adapted to drive the golf cart may be varied from that equal to a very slow walk to that of a brisk walk. The operator of the golf cart may hold tightly to the handle to permit the vehicle to pull him forward and thus conserve his energy as he moves about on the golf course.

While the preferred form of this invention is disclosed herein, such modifications, alterations and changes as may occur to those skilled in the art are considered to be embraced by the present invention as are encompassed within the scope of the appended claims.

I claim:

1. A wheeled vehicle with variable speed drive mechanism comprising:
   (a) a vertically disposed frame supported at opposite sides thereof by a pair of wheels;
   (b) yoke means having vertically extending, elongated openings therein fixed on opposite sides of said frame and disposed with said openings in alignment;
   (c) motor means floatingly mounted in said elongated openings in said yoke means for limited lateral and vertical movement therein;
   (d) means for limiting said lateral movement of said motor means in said yoke means in each direction;
   (e) resilient means moving said motor means laterally of said yoke means to the limit of movement thereof in one direction, (f) said motor means being disposed in lowermost position with respect to said yoke means when moved to the limit of movement in said one direction;

(g) cone pulley means connected for movement with and driven by said motor means and disposed above and contiguous to said pair of wheels, (h) the small end of said cone pulley means being disposed adjacent the periphery of said pair of wheels when said motor means is moved to the limit of movement in said one direction; and (i) means for moving said motor means in the other direction in said yoke means to bring said cone pulley means adjacent said small end thereof into driving contact with said pair of wheels for driving said pair of wheels in the same direction.

2. A wheeled vehicle and motor drive therefor as defined in claim 1 wherein:

(a) said motor means includes an aperture therein adapted to slidingly receive one end of said resilient means therein, (b) said resilient means being of elongated bar-like configuration, (c) one end of said bar being rigidly secured to said frame, and (d) the other end of said bar being disposed in said aperture.

3. A wheeled vehicle and motor drive therefor as defined in claim 1 wherein:

(a) said motor means includes a pair of constant speed electric motors rigidly secured together in back-to-back, axial alignment with the drive shafts thereof extending outwardly in opposite directions, (b) said cone pulley means including a cone pulley mounted on each of said drive shafts with the taper of each pulley diverging in the same direction.

References Cited in the file of this patent

UNITED STATES PATENTS

| | | |
|---|---|---|
| 1,598,124 | Evans | Aug. 31, 1926 |
| 2,036,637 | Kingsbury | Apr. 7, 1936 |

FOREIGN PATENTS

| | | |
|---|---|---|
| 1,031,966 | France | Mar. 25, 1953 |
| 653,158 | Great Britain | May 9, 1951 |